US009012026B2

(12) United States Patent
Briffaud et al.

(10) Patent No.: US 9,012,026 B2
(45) Date of Patent: *Apr. 21, 2015

(54) SEMIAROMATIC POLYAMIDE COMPRISING A CHAIN ENDING

(71) Applicant: Arkema France, Colombes (FR)

(72) Inventors: Thierry Briffaud, Caorches Saint Nicholas (FR); Philippe Blondel, Bernay (FR)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/242,185

(22) Filed: Apr. 1, 2014

(65) Prior Publication Data

US 2014/0212613 A1    Jul. 31, 2014

Related U.S. Application Data

(62) Division of application No. 13/057,828, filed as application No. PCT/FR2009/051566 on Aug. 6, 2009, now Pat. No. 8,748,004.

(30) Foreign Application Priority Data

Aug. 8, 2008 (FR) ..................... 08 55501
Oct. 3, 2008 (FR) ..................... 08 56705

(51) Int. Cl.
| | |
|---|---|
| C08G 69/04 | (2006.01) |
| C08G 69/28 | (2006.01) |
| C08L 23/26 | (2006.01) |
| C08L 77/06 | (2006.01) |
| B32B 27/34 | (2006.01) |
| C09D 177/06 | (2006.01) |
| C08G 69/26 | (2006.01) |
| C08G 69/36 | (2006.01) |
| C08L 37/00 | (2006.01) |
| C08K 3/32 | (2006.01) |

(52) U.S. Cl.
CPC .............. *C09D 177/06* (2013.01); *C08G 69/26* (2013.01); *C08G 69/265* (2013.01); *C08G 69/28* (2013.01); *C08G 69/36* (2013.01); *C08K 3/32* (2013.01); *C08L 77/06* (2013.01); *C08L 37/00* (2013.01)

(58) Field of Classification Search
CPC ................... G08G 69/00–69/36; G08G 69/48; C08L 77/00–77/10
USPC ......... 428/36.8, 36.9, 36.91, 36.92, 357, 402, 428/474.4; 524/514, 538; 525/66, 179, 182, 525/183; 528/310, 323, 324, 325, 326, 528/329.1, 335, 338, 339, 340
See application file for complete search history.

(56) References Cited

U.S. PATENT DOCUMENTS

| | | | |
|---|---|---|---|
| 5,440,006 A | 8/1995 | Lahary et al. | |
| 5,962,628 A | 10/1999 | Keske | |
| 8,420,772 B2 | 4/2013 | Cao et al. | |
| 2005/0096430 A1* | 5/2005 | Blondel et al. ................ 525/178 |
| 2008/0038499 A1 | 2/2008 | Ono et al. | |
| 2008/0274355 A1 | 11/2008 | Hewel | |
| 2009/0098325 A1 | 4/2009 | Uchida et al. | |
| 2010/0267923 A1 | 10/2010 | Cao et al. | |

FOREIGN PATENT DOCUMENTS

| | | |
|---|---|---|
| EP | 1 505 099 A2 | 2/2005 |
| EP | 1 860 134 A1 | 11/2007 |
| EP | 1 988 113 A1 | 11/2008 |
| EP | 2 301 985 A1 | 3/2011 |
| JP | 2003213010 A | 7/2003 |
| JP | 2005054191 A | 3/2005 |
| JP | 2007217619 A | 8/2007 |
| JP | 2008380099 A | 2/2008 |

OTHER PUBLICATIONS

International Search Report of PCT/FR2009/051566 (Dec. 3, 2009).
Asahi Kasei Chemicals Corp., "Polyamide-Polyphenylene Ether-Based Resin Film," Patent Abstracts of Japan, Publication Date: Aug. 30, 2007; English Abstract of JP-2007217619.
Arkema, "Low-Hygroscopic Flexible Semi-Aromatic Polyamide," Patent Abstracts of Japan, Publication Date: Mar. 3, 2005; English Abstract of JP-2005054191.
Machine Translation of JP2003-213010, dated Jul. 30, 2003; Mitsubishi Engineering Plastics Corp.

* cited by examiner

*Primary Examiner* — Ana Woodward
(74) *Attorney, Agent, or Firm* — Millen, White, Zelano & Branigan, P.C.

(57) ABSTRACT

The invention relates to a copolyamide comprising at least two different units corresponding to the following general formulation:

A/X.T

A is chosen from a unit obtained from an amino acid, a unit obtained from a lactam and a unit corresponding to the formula ($C_a$ diamine).($C_b$ diacid), with a representing the number of carbon atoms of the diamine and b representing the number of carbon atoms of the diacid, a and b each being between 4 and 36, advantageously between 9 and 18,
X.T denotes a unit obtained from the polycondensation of a $C_x$ diamine and of terephthalic acid, with x representing the number of carbon atoms of the $C_x$ diamine, x being between 9 and 36, advantageously between 10 and 18,
characterized in that said copolyamide exhibits:
  a content of amine chain ends of greater than or equal to 20 µeq/g,
  a content of acid chain ends of less than or equal to 100 µeq/g, and
  a content of unreactive chain ends of greater than or equal to 20 µeq/g,
and to the process for the preparation of said copolyamide, to a composition comprising this copolyamide and to the use of this copolyamide and of such a composition.

26 Claims, No Drawings

SEMIAROMATIC POLYAMIDE COMPRISING A CHAIN ENDING

FIELD OF THE INVENTION

A subject matter of the present invention is a semiaromatic copolyamide, its process of preparation and its uses, in particular in the manufacture of various objects, such as standard consumer goods, for example electrical, electronic or motor vehicle equipment, surgical equipment, packaging or sports equipment.

The invention also relates to a composition comprising such a copolyamide and to the uses of this composition, in particular in the manufacture of all or some of the objects which have just been listed above.

THE PRIOR ART AND THE TECHNICAL PROBLEM

It is known from the prior art to use compounds, such as monofunctional acids, during the synthesis of polyamide. These compounds are generally used to halt the polymerization.

Generally, polyamides comprise at least two identical or different repeat units, these units being formed from the two corresponding monomers or comonomers. The polyamides are thus prepared from two or more monomers or comonomers chosen from an amino acid, a lactam and/or a dicarboxylic acid and a diamine.

Consequently, subsequent to the polycondensation, the macromolecules are terminated either by an amine functional group and an acid functional group or by two amine functional groups or by two acid functional groups.

In point of fact, it has turned out that the control of the chain ends has a direct impact on the properties of the final polyamide. This is because it has been observed that, during the formulation of the polyamide or during its conversion, the amine and/or acid functional groups carried by the macromolecules have a tendency either to react with other molecules present in the medium, such as, for example, additives, or to polymerize with one another, or to react with one another.

Thus, when the polyamide comprises an excessively high content of acid functional groups, the product has a tendency to decompose during its conversion: the viscosity falls when the polyamide is in solution, resulting in poor properties, in particular mechanical properties, which have effects on its uses after conversion and formulation.

Likewise, when the polyamide comprises an excessively high content of amine functional groups, it has been observed that the product has a tendency to crosslink during the formulation and then during the conversion to give the finished product, indeed even during the use of said product at high temperature, rendering it unsuitable for the desired use.

If the proportions of amine chain ends are excessively reduced, then the polyamide cannot result in a homogeneous alloy with other polymers, in particular with polyolefins.

Finally, when the amine and acid functional groups are present in an identical amount, the product is very difficult to polymerize in the molten state or in the solid state, its rate of polymerization being excessively fast. The product also polymerizes during the conversion to give the finished component and becomes excessively viscous. It no longer correctly fills the injection molds. Neither does it make it possible to obtain extruded components (for example pipes) within acceptable dimensions.

Consequently, there exists a real need to control these chain ends so as to improve the properties of the polyamides, that is to say so as to obtain polyamides which are more manipulable during their conversion.

BRIEF DESCRIPTION OF THE INVENTION

Surprisingly, the applicant company has found that these needs are met with a copolyamide comprising at least two different units corresponding to the following general formulation:

A/X.T in which:
A is chosen from a unit obtained from an amino acid, a unit obtained from a lactam and a unit corresponding to the formula ($C_a$ diamine).($C_b$ diacid), with a representing the number of carbon atoms of the diamine and b representing the number of carbon atoms of the diacid, a and b each being between 4 and 36, advantageously between 9 and 18,
X.T denotes a unit obtained from the polycondensation of a $C_x$ diamine and of terephthalic acid, with x representing the number of carbon atoms of the $C_x$ diamine x being between 9 and 36, advantageously between 10 and 18,
said copolyamide exhibiting:
  a content of amine chain ends of greater than or equal to 20 µeq/g, advantageously between 25 and 100 µeq/g and preferably between 30 and 58 µeq/g,
  a content of acid chain ends of less than or equal to 100 µeq/g, advantageously between 2 and 80 µeq/g and preferably between 15 and 50 µeq/g,
  a content of unreactive chain ends of greater than or equal to 20 µeq/g, advantageously of greater than or equal to 30 µeq/g and preferably between 35 and 200 µeq/g.

The invention thus relates to the control of the three types of chain ends in order to obtain, during and after formulation, in the presence or absence of additives, satisfactory properties of the product and processing conditions which are also satisfactory.

Another subject matter of the present invention is the process for the preparation of said copolyamide.

Another subject matter of the present invention is a composition comprising the copolyamide according to the invention.

Finally, a subject matter of the present invention is the use of the copolyamide and of the composition according to the invention to form a monolayer or multilayer structure.

DETAILED DESCRIPTION OF THE INVENTION

Other characteristics, aspects, subject matters and advantages of the present invention will become even more clearly apparent on reading the description and examples which follow.

According to a first aspect of the invention, the invention relates to a copolyamide comprising at least two different units corresponding to the following general formulation:

A/X.T in which:
A is chosen from a unit obtained from an amino acid, a unit obtained from a lactam and a unit corresponding to the formula ($C_a$ diamine).($C_b$ diacid), with a representing the number of carbon atoms of the diamine and b representing the number of carbon atoms of the diacid, a and b each being between 4 and 36, advantageously between 9 and 18,
X.T denotes a unit obtained from the polycondensation of a $C_x$ diamine and of terephthalic acid, with x representing the number of carbon atoms of the $C_x$ diamine, x being between 9 and 36, advantageously between 10 and 18, characterized in that said copolyamide exhibits:
- a content of amine chain ends of greater than or equal to 20 µeq/g,
- a content of acid chain ends of less than or equal to 100 µeq/g,
- a content of unreactive chain ends of greater than or equal to 20 µeq/g.

It is specified that the expression "between" used in the preceding paragraphs but also in the continuation of the present description should be understood as including each of the limits mentioned.

Surprisingly, the applicant company has found that it was necessary to precisely control the amount of reactive functional groups and the amount of unreactive functional groups.

The content of chain end of each of the amine and acid functional groups and the unreactive functional group is measured conventionally and in a way known to a person skilled in the art by NMR (Nuclear Magnetic Resonance).

Preferably, the content of amine chain ends is between and 100 µeq/g and preferably between 30 and 58 µeq/g.

Preferably, the content of acid chain ends is between 2 and 80 µeq/g and preferably between 15 and 50 µeq/g.

Preferably, the content of unreactive chain ends is advantageously greater than or equal to 30 µeq/g and preferably between 35 and 200 µeq/g.

As regards more specifically the meaning of the unit A, when A represents an amino acid, it can be chosen from 9-aminononanoic acid (A=9), 10-aminoundecanoic acid (A=11), amino-11-undecanoic acid (A=11), 12-aminododecanoic acid (A=12) and 11-aminoundecanoic acid (A=11) and its derivatives, in particular N-heptyl-11-aminoundecanoic acid.

In place of one amino acid, a mixture of two, three or more amino acids might also be envisaged. However, the copolyamides formed would then respectively comprise three, four or more units.

When A represents a lactam, it can be chosen from pyrrolidinone, 2-piperidinone, enantholactam, caprylolactam, pelargolactam, decanolactam, undecanolactam and lauryllactam (A=12).

Preferably, A denotes a unit obtained from a monomer chosen from 10-aminodecanoic acid (denoted 10), 11-aminoundecanoic acid (denoted 11), 12-aminododecanoic acid (denoted 12) and lauryllactam (denoted L12).

When the unit A is a unit corresponding to the formula ($C_a$ diamine).($C_b$ diacid), the ($C_a$ diamine) unit is chosen from linear or branched aliphatic diamines, cycloaliphatic diamines and alkylaromatic diamines.

When the diamine is aliphatic and linear, of formula $H_2N-(CH_2)_a-NH_2$, the ($C_a$ diamine) monomer is preferably chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecanediamine (a=18), eicosanediamine (a=20), docosanediamine (a=22) and the diamines obtained from fatty acids.

When the diamine is aliphatic and branched, it can comprise one or more methyl or ethyl substituents on the main chain. For example, the ($C_a$ diamine) monomer can advantageously be chosen from 2,2,4-trimethyl-1,6-hexanediamine, 2,4,4-trimethyl-1,6-hexanediamine, 1,3-diaminopentane, 2-methyl-1,5-pentanediamine or 2-methyl-1,8-octanediamine.

When the ($C_a$ diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), bis(p-aminocyclohexyl)-methane (PACM) and isopropylidenedi(cyclohexylamine) (PACP). It can also comprise the following carbon-comprising backbones: norbornylmethane, cyclohexylmethane, dicyclohexylpropane, di(methylcyclohexyl) or di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the ($C_a$ diamine) monomer is alkylaromatic, it is chosen from 1,3-xylylenediamine and 1,4-xylylenediamine.

The ($C_b$ diacid) unit is chosen from linear or branched aliphatic diacids, cycloaliphatic diacids and aromatic diacids.

When the ($C_b$ diacid) monomer is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanedioic acid (b=18), octadecanedioic acid (b=18), eicosanedioic acid (b=20), docosanedioic acid (b=22) and fatty acid dimers comprising 36 carbons.

The abovementioned fatty acid dimers are dimerized fatty acids obtained by oligomerization or polymerization of unsaturated monobasic fatty acids comprising a long hydrocarbon chain (such as linoleic acid and oleic acid), as described in particular in the document EP 0 471 566.

When the diacid is cycloaliphatic, it can comprise the following carbon-comprising backbones: norbornylmethane, cyclohexylmethane, dicyclohexylmethane, dicyclohexylpropane, di(methylcyclohexyl) or di(methylcyclohexyl)propane.

When the diacid is aromatic, it is chosen from terephthalic acid (denoted T), isophthalic acid (denoted I) and naphthalene diacids.

More particularly advantageously, the $C_b$ diacid of the unit A, when it corresponds to the formula ($C_a$ diamine).($C_b$ diacid), is a linear or branched aliphatic diacid or a cycloaliphatic diacid.

Preferably, the unit X denotes a unit obtained from a diamine comprising a number of carbons, denoted x, between 9 and 36, advantageously between 10 and 18 and more preferably 10.

This diamine can be linear or branched aliphatic, cycloaliphatic or alkylaromatic.

When the diamine is aliphatic and branched, it can comprise one or more methyl or ethyl substituents on the main chain. For example, it can advantageously be chosen from 2,2,4-trimethyl-1,6-hexanediamine, 2,4,4-trimethyl-1,6-hexanediamine and 2-methyl-1,8-octanediamine.

Advantageously, the diamine is aliphatic and linear, of formula $H_2N-(CH_2)_x-NH_2$, and chosen from nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22) and diamines obtained from fatty acids.

Preferably, the unit X denotes a unit obtained from 1,10-decanediamine (x=10).

Among the combinations which can be envisaged, the following copolyamides have a particularly marked advantage:

they are the copolyamides corresponding to one of the formulae chosen from 11/10.T, 12/10.T, 6.10/10.T, 6.12/10.T, 10.10/10.T, 10.12/10.T and 12.12/10.T.

Preferably, the molar proportions of diamine denoted X and of terephthalic acid denoted T are preferentially stoichiometric.

Preferably, the molar ratio of the unit(s) A to the unit(s) X.T is between 0.05 and 0.5 and preferably between 0.1 and 0.4.

According to a second aspect of the invention, the copolyamide is a copolymer comprising only two different units, namely a unit A and the unit X.T, preferably the unit 10.T.

According to a third aspect of the invention, the copolyamide additionally comprises at least three different units and corresponds to the following formula:

A/X.T/Z in which:
the units A and X.T have the same meanings as defined above, and Z is chosen from a unit obtained from an amino acid, a unit obtained from a lactam or a unit corresponding to the formula ($C_d$ diamine).($C_e$ diacid), with d representing the number of carbon atoms of the diamine and e representing the number of carbon atoms of the diacid, d and e each being between 4 and 36, advantageously between 9 and 18.

When Z represents a unit obtained from an amino acid, it can be chosen from 9-aminononanoic acid (Z=9), 10-aminodecanoic acid (Z=10), 10-aminoundecanoic acid (denoted 11), 12-aminododecanoic acid (Z=12) and 11-aminoundecanoic acid (Z=11) and its derivatives, in particular N-heptyl-11-aminoundecanoic acid.

In place of one amino acid, a mixture of two, three or more amino acids might also be envisaged. If this happens, the copolyamides formed would then respectively comprise four, five or more units.

When Z represents a unit obtained from a lactam, it can be chosen from pyrrolidinone, 2-piperidinone, caprolactam (Z=6), enantholactam, caprylolactam, pelargolactam, decanolactam, undecanolactam and lauryllactam (Z=12).

In place of one lactam, a mixture of two, three or more lactams or a mixture of one or more amino acids and of one or more lactams might also be envisaged. If this happens, the copolyamides formed would then respectively comprise four, five or more units.

Among the combinations which can be envisaged, the following copolyamides have a particularly marked advantage: they are the copolyamides corresponding to one of the formulae chosen from 11/10.T/12, 11/10.T/6 and 12/10.T/6.

The specific case where the unit Z, when it is a unit obtained from a lactam or an amino acid, is strictly identical to the unit A is very obviously excluded. This is because, in this specific event, the copolyamide is that already envisaged according to the first aspect of the invention.

When the unit Z is a unit corresponding to the formula ($C_d$ diamine).($C_e$ diacid), the ($C_d$ diamine) unit is chosen from linear or branched aliphatic diamines, cycloaliphatic diamines and alkylaromatic diamines.

When the diamine is aliphatic and linear, of formula $H_2N-(CH_2)_a-NH_2$, the ($C_d$ diamine) monomer is chosen from butanediamine (d=4), pentanediamine (d=5), hexanediamine (d=6), heptanediamine (d=7), octanediamine (d=8), nonanediamine (d=9), decanediamine (d=10), undecanediamine (d=11), dodecanediamine (d=12), tridecanediamine (d=13), tetradecanediamine (d=14), hexadecanediamine (d=16), octadecanediamine (d=18), octadecenediamine (d=18), eicosanediamine (d=20), docosanediamine (d=22) and diamines obtained from fatty acids.

When the diamine is aliphatic and branched, it can comprise one or more methyl or ethyl substituents on the main chain. For example, the ($C_d$ diamine) monomer can advantageously be chosen from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the ($C_d$ diamine) monomer is cycloaliphatic, it is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), bis(p-aminocyclohexyl)-methane (PACM) and isopropylidenedi(cyclohexylamine) (PACP). It can also comprise the following carbon-comprising backbones: norbornylmethane, cyclohexylmethane, dicyclohexylpropane, di(methylcyclohexyl) or di(methylcyclohexyl)propane. A nonexhaustive list of these cycloaliphatic diamines is given in the publication "Cycloaliphatic Amines" (Encyclopaedia of Chemical Technology, Kirk-Othmer, 4th Edition (1992), pp. 386-405).

When the ($C_d$ diamine) monomer is alkylaromatic, it is chosen from 1,3-xylylenediamine and 1,4-xylylenediamine.

The ($C_e$ diacid) unit is chosen from linear or branched aliphatic diacids, cycloaliphatic diacids and aromatic diacids.

When the ($C_e$ diacid) monomer is aliphatic and linear, it is chosen from succinic acid (e=4), pentanedioic acid (e=5), adipic acid (e=6), heptanedioic acid (e=7), octanedioic acid (e=8), azelaic acid (e=9), sebacic acid (e=10), undecanedioic acid (e=11), dodecanedioic acid (e=12), brassylic acid (e=13), tetradecanedioic acid (e=14), hexadecanedioic acid (e=16), octadecanedioic acid (e=18), octadecanedioic acid (e=18), eicosanedioic acid (e=20), docosanedioic acid (e=22) and fatty acid dimers comprising 36 carbons.

The abovementioned fatty acid dimers are dimerized fatty acids obtained by oligomerization or polymerization of unsaturated monobasic fatty acids comprising a long hydrocarbon chain (such as linoleic acid and oleic acid), as described in particular in the document EP 0 471 566.

When the diacid is cycloaliphatic, it can comprise the following carbon-comprising backbones: norbornylmethane, cyclohexylmethane, dicyclohexylmethane, dicyclohexylpropane, di(methylcyclohexyl) or di(methylcyclohexyl) propane.

When the diacid is aromatic, it is chosen from terephthalic acid (denoted T), isophthalic acid (denoted I) and naphthalene diacids.

The specific case where the ($C_d$ diamine).($C_e$ diacid) unit is strictly identical to the unit 10.T or the unit A, when A has the following meaning: ($C_a$ diamine).($C_b$ diacid), is very obviously excluded. This is because, in these specific events, the copolyamide is again that already envisaged according to the second aspect of the invention.

Among all the possible combinations for the A/10.T/Z copolyamides in which Z is a ($C_d$ diamine).($C_e$ diacid) unit, the copolyamides corresponding to one of the formulae chosen from 11/10.T/10.I, 12/10.T/10.1, 10.10/10.T/10.I, 10.6/10.T/10.1 and 10.14/10.T/10.1 will in particular be selected.

Preferably, when Z denotes a ($C_d$ diamine).($C_e$ diacid) unit, the ($C_e$ diacid) monomer is aliphatic and linear. In particular, the copolyamides corresponding to one of the formulae chosen from 11/10.T/10.6 and 12/10.T/10.6 will be selected.

In an advantageous version of the invention, the molar ratio of the sum of the units A and Z to the unit(s) 10.T (i.e., (A+Z)/10.T) in the terpolymer is between 0.1 and 1 and preferably between 0.2 and 0.7.

In place of one ($C_d$ diamine).($C_e$ diacid) unit, a mixture of two, three or more ($C_d$ diamine).($C_e$ diacid) units or a mixture of one or more amino acids and/or of one or more lactams with one or more ($C_d$ diamine).($C_e$ diacid) units might also be envisaged. If this happens, the copolyamides formed would then respectively comprise four, five or more units.

The copolyamide according to the invention can comprise monomers originating from resources resulting from renewable starting materials, that is to say comprising organic carbon resulting from biomass and determined according to the standard ASTM D6866. These monomers resulting from renewable starting materials can be 1,10-decanediamine or, when they are present, in particular 11-aminoundecanoic acid, aliphatic and linear diamines and diacids as defined above.

While, with the exception of N-heptyl-11-aminoundecanoic acid, fatty acid dimers and cycloaliphatic diamines, the comonomers or starting materials envisaged in the present description (amino acids, diamines, diacids) are actually linear, nothing makes it impossible to envisage that they can, in all or part, be branched, such as 2-methyl-1,5-diaminopentane, or partially unsaturated.

It should be noted in particular that the $C_{18}$ dicarboxylic acid can be octadecanedioic acid, which is saturated, or else octadecanedioic acid, which for its part exhibits one unsaturation.

According to the present invention, the chain-terminating agents are compounds capable of reacting with the amine and/or carboxylic acid end functional groups of the polyamides, thus halting the reactivity of the end of the macromolecule and in particular the polycondensation.

The termination reaction can be illustrated in the following way:

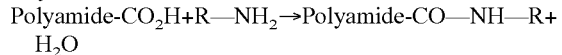
Polyamide-$CO_2H$+R—$NH_2$→Polyamide-CO—NH—R+$H_2O$
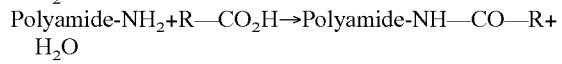
Polyamide-$NH_2$+R—$CO_2H$→Polyamide-NH—CO—R+$H_2O$ Thus, the chain-terminating agents appropriate for reacting with the amine end functional group can be monocarboxylic acids, anhydrides, such as phthalic anhydride, monohalogenated acids, monoesters or monoisocyanates.

Preferably, monocarboxylic acids are used. They can be chosen from aliphatic monocarboxylic acids, such as acetic acid, propionic acid, lactic acid, valeric acid, caproic acid, capric acid, lauric acid, tridecylic acid, myristic acid, palmitic acid, stearic acid, pivalic acid and isobutyric acid; alicyclic acids, such as cyclohexanecarboxylic acid; aromatic monocarboxylic acids, such as toluic acid, α-naphthalenecarboxylic acid, β-naphthalenecarboxylic acid, methylnaphthalenecarboxylic acid and phenylacetic acid; and their mixtures. The preferred compounds are aliphatic acids and in particular acetic acid, propionic acid, lactic acid, valeric acid, caproic acid, capric acid, lauric acid, tridecylic acid, myristic acid, palmitic acid and stearic acid.

Mention may be made, among chain-terminating agents appropriate for reacting with the acid end functional group, of monoamines, monoalcohols or monoisocyanates.

Preferably, monoamines are used. They can be chosen from aliphatic monoamines, such as methylamine, ethylamine, propylamine, butylamine, hexylamine, octylamine, decylamine, laurylamine, stearylamine, dimethylamine, diethylamine, dipropylamine and dibutylamine; alicyclic amines, such as cyclohexylamine and dicyclohexylamine; aromatic monoamines, such as aniline, toluidine, diphenylamine and naphthylamine; and their mixtures.

The preferred compounds are butylamine, hexylamine, octylamine, decylamine, laurylamine, stearylamine, cyclohexylamine and aniline.

It is also possible to react the acid and/or amine ends respectively with inorganic bases, such as alkali metal and alkaline earth metal hydroxides, such as potassium hydroxide and sodium hydroxide, and with inorganic acids, such as HCl, $HNO_3$ and $H_2SO_4$, according to the following reaction scheme:

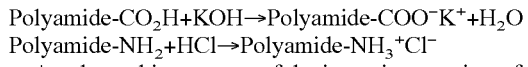
Polyamide-$CO_2H$+KOH→Polyamide-$COO^-K^+$+$H_2O$
Polyamide-$NH_2$+HCl→Polyamide-$NH_3^+Cl^-$ Another subject matter of the invention consists of a process for the preparation of the copolyamide as defined above. This process comprises a stage of polycondensation of the comonomers as defined above in the presence of the chain-terminating agents, this being done in amounts predetermined according to the specific copolyamide desired.

Processes for the preparation of the copolyamide A/X.T according to the invention, A being, for example, an amino acid, are described below.

Very obviously, these embodiments can be transposed to the cases in which A is a lactam or a ($C_a$ diamine).($C_b$ aliphatic diacid) mixture.

According to a first embodiment of the process according to the present invention, said process comprises the single stage of reaction between the amino acid A and the stoichiometric combination of the diamine X and terephthalic acid, in the presence of sodium hypophosphite and at least one chain-terminating agent, of water and optionally of other additives.

According to this first embodiment, the single stage is carried out within a temperature range between 200 and 380° C.

This stage is carried out under an inert atmosphere and within a pressure range between 0.01 and 50 bar.

This stage is composed of several substages. During the first substage, the reactor is maintained under a steam autogenous pressure between 10 and 50 bar at a first stationary temperature level. During the second substage, the pressure is gradually brought back to atmospheric pressure and the temperature is increased to a second stationary temperature level. The reaction time is generally from 30 minutes to 10 hours and depends on the temperature. The higher the reaction temperature, the shorter the reaction time. The reaction time must, in all cases, be sufficient to ensure that the reaction has taken place quantitatively.

The stationary temperature levels lie within the range from 200 to 380° C. defined above.

According to a second embodiment of the process according to the present invention, said process comprises two stages. The first stage results in the preparation of an oligomeric diacid which will polycondense with the diamine during the second stage, according to the following sequence:
 (i) a first stage of reaction between terephthalic acid and the amino acid A, in the presence of a hypophosphite salt; and
 (ii) a second stage of reaction of the oligomeric diacid thus formed in the preceding stage with the $C_x$ diamine.

The chain-terminating agent or agents are introduced during the first and/or second stage.

In the first reaction stage, the oligomeric diacid is prepared by condensation of terephthalic acid with the amino acid A, in the presence of a hypophosphite salt. The reaction is carried out in a reactor under an inert atmosphere, at atmospheric pressure and/or under pressure, the reactants being maintained, preferably with stirring, at a temperature between 140 and 350° C. and preferably between 200 and 300° C. The reaction is generally carried out in from 1 to 5 hours at atmospheric pressure or under a maximum pressure of 50 bar.

In the second stage, the $C_x$ diamine is added, at atmospheric pressure, to the oligomeric diacid formed in the preceding stage and is reacted at a temperature between 200 and 350° C., preferably between 240 and 300° C. The reaction is generally carried out in an inert atmosphere in from 1 to 10 hours under vacuum and/or at atmospheric pressure and/or at a maximum pressure of 50 bar.

The chain-terminating agent or agents are introduced during the first and/or second stage.

In the case where A is a ($C_a$ diamine).($C_b$ diacid) mixture, it is possible to introduce from 10 to 100% by weight of the $C_a$ diamine in the first reaction stage (i), the possible remainder of the $C_a$ diamine being introduced with the $C_b$ diacid in the second reaction stage (ii).

According to a third embodiment of the process according to the present invention, said process comprises two stages:
(i) a first stage of reaction of the amino acid A with terephthalic acid and with from 10 to 90% by weight of the $C_x$ diamine in the presence of a hypophosphite salt; and
(ii) a second stage of reaction of the oligomer produced in stage (i) with the balance of the $C_x$ diamine on one or more occasions.

In both stages, the temperature is between 220 and 380° C., preferably between 280 and 330° C. The process is carried out under an inert atmosphere, under at pressure of up to 50 bar or at atmospheric pressure, or under vacuum. The reaction is generally carried out in from 1 to 10 hours.

The chain-terminating agent or agents are introduced during the first and/or second stage.

In the case where A is a ($C_a$ diamine).($C_b$ diacid) mixture, it is possible to introduce from 10 to 100% by weight of the $C_a$ diamine in the first reaction stage (i), the possible remainder of the $C_a$ diamine being introduced with the $C_b$ aliphatic diacid in the second reaction stage (ii).

According to a fourth embodiment of the process according to the present invention, said process comprises two stages:
(i) a first stage of reaction of the amino acid A with terephthalic acid, all the diamine, in the presence of a hypophosphite salt; an oligomer is obtained by emptying the reactor under steam pressure and crystallization of said oligomer;
(ii) a second stage of postpolymerization at atmospheric pressure or under vacuum of the oligomer produced in stage (i).

The chain-terminating agent or agents are introduced during the first and/or second stage.

In the first stage, the temperature is between 200 and 300° C. and preferably between 220 and 260° C. The process is carried out under an inert atmosphere, under a pressure of up to 50 bar. The reaction is generally carried out in from 1 to 10 hours. A "prepolymer" is taken out of the reactor, the degree of progression of the reaction of which is between 0.4 and 0.99.

In the second stage, the temperature is between 220 and 380° C. and preferably between 280 and 330° C. The process is carried out under an inert atmosphere, at atmospheric pressure or under vacuum. The reaction is generally carried out in a few seconds and up to several tens of hours according to the polymerization temperature.

The chain-terminating agent or agents are introduced during the first and/or second stage.

This prepolymer can be taken up directly or with intermediate storage in a solid form (granular or powder form, for example), in order to bring the polycondensation to completion. This operation is referred to as: rise in viscosity. This rise in viscosity can be produced on a reactor of extruder type at atmospheric pressure or under vacuum. This rise in viscosity can also, in the case of the crystalline or semicrystalline copolyamides, be produced in the solid phase, at a temperature lying between the glass transition temperature (Tg) and the melting point. Conventionally, it is a temperature approximately 100° C. above the Tg. The heating can be provided by a heat-exchange gas or fluid, such as nitrogen, steam or inert liquids, such as certain hydrocarbons.

The processes according to the present invention can be carried out in any reactor conventionally used in polymerization, such as reactors comprising anchor or ribbon stirrers. However, when the process comprises a stage (ii) as defined above, it can also be carried out in a horizontal reactor or finisher. These finishers can be equipped with an arrangement for placing under vacuum or for introducing the reactant (addition of diamine), which may or may not be staged, and can operate within a broad temperature range.

It is possible to add, to these copolyamides, on conclusion of the process or during the second stage, when the process comprises two stages, in addition to the balance of diamine, known additives of polyamides, such as fillers, glass fibers, dyes, stabilizers, in particular UV stabilizers, plasticizers, impact modifiers, surface-active agents, pigments, optical brighteners, antioxidants, natural waxes, polyolefins and their mixtures.

The fillers envisaged in the context of the present invention include conventional inorganic fillers, such as fillers chosen from the group, given without implied limitation, consisting of kaolin, magnesia, slag, and the like, and glass fibers. The filler used more generally is formed of glass fibers, the size of which is advantageously between 0.20 and 25 mm. It is possible to include therein a coupling agent for improving the adhesion of the fibers to the polyamide, such as silanes or titanates, which are known to a person skilled in the art. Anionic fillers can also be used, such as graphite or aramid fibers (aramids are completely aromatic polyamides).

Preferably, the additives for the copolyamide prepared according to the present invention are provided in an amount of up to 90% by weight, preferably from 1 to 60% by weight and preferably of the order of 30% by weight, with respect to the weight of the composition.

Preferably, the glass fibers are present in the composition generally in a content of 10 to 50% by weight, preferably of the order of 30% by weight, with respect to the total weight of the composition.

The invention also relates to a composition comprising at least one copolyamide according to the invention.

A composition in accordance with the invention can additionally comprise at least one second polymer.

Advantageously, this second polymer can be chosen from a semicrystalline polyamide, an amorphous polyamide, a semicrystalline copolyamide, an amorphous copolyamide, a polyetheramide, a polyesteramide, an aromatic polyester, an arylamide and their blends.

This second polymer can also be chosen from starch, which can be modified and/or formulated, cellulose or its derivatives, such as cellulose acetate or cellulose ethers, polylactic acid, polyglycolic acid and polyhydroxyalkanoates.

In particular, this second polymer can be one or more functional or nonfunctional and crosslinked or noncrosslinked polyolefins.

As regards the crosslinked polyolefins, this phase can originate from the reaction (i) of two polyolefins having groups which react with one another, (ii) of maleicized polyolefins with a monomeric, oligomeric or polymeric diamino molecule or (iii) of one (or more) unsaturated polyolefin(s) which carry(ies) unsaturation and which can be crosslinked, for example by the peroxide route.

Among the reaction routes (i), (ii) and (iii) mentioned, it is the reaction of two polyolefins (i) which is favored, the corresponding crosslinked phase originating, for example, from the reaction:
- of a product (A) comprising an unsaturated epoxide,
- of a product (B) comprising an unsaturated carboxylic acid anhydride,
- optionally of a product (C) comprising an unsaturated carboxylic acid or an α,ω-aminocarboxylic acid.

Product A

Mention may be made, as example of product (A), of those comprising ethylene and an unsaturated epoxide.

According to a first form of the invention, (A) is either a polyolefin grafted by an unsaturated epoxide or a copolymer of ethylene and of an unsaturated epoxide.

As regards the polyolefin grafted by an unsaturated epoxide, the term "polyolefin" is understood to mean the polymers comprising olefin units, such as, for example, ethylene, propylene or 1-butene units or any other α-olefin. Mention may be made, by way of example, of:
- polyethylenes, such as LDPEs, HDPEs, LLDPEs or VLDPEs, polypropylene, ethylene/propylene copolymers, EPRs (ethylene/propylene rubbers) or metallocene PEs (copolymers obtained by single-site catalysis);
- styrene/ethylene-butene/styrene block copolymers (SEBSs), styrene/butadiene/styrene block copolymers (SBSs), styrene/isoprene/styrene block copolymers (SISs), styrene/ethylene-propylene/styrene block copolymers or ethylene/propylene/dienes (EPDMs);
- copolymers of ethylene with at least one product chosen from salts or esters of unsaturated carboxylic acids or vinyl esters of saturated carboxylic acids.

Advantageously, the polyolefin is chosen from LLDPE, VLDPE, polypropylene, ethylene/vinyl acetate copolymers or ethylene/alkyl (meth)acrylate copolymers. The density can advantageously be between 0.86 and 0.965 and the flow index (MFI) can be between 0.3 and 40 (in g/10 min at 190° C. under 2.16 kg).

As regards the copolymers of ethylene and of an unsaturated epoxide, mention may be made, for example, of copolymers of ethylene, of an alkyl (meth)acrylate and of an unsaturated epoxide or copolymers of ethylene, of a saturated carboxylic acid vinyl ester and of an unsaturated epoxide. The amount of epoxide can be up to 15% by weight of the copolymer and the amount of ethylene at least 50% by weight.

Advantageously, (A) is a copolymer of ethylene, of an alkyl (meth)acrylate and of an unsaturated epoxide.

Preferably, the alkyl (meth)acrylate is such that the alkyl has from 2 to 10 carbon atoms.

The MFI (melt flow index) of (A) can be, for example, between 0.1 and 50 (g/10 min at 190° C. under 2.16 kg).

Examples of alkyl acrylate or methacrylate which can be used are in particular methyl methacrylate, ethyl acrylate, n-butyl acrylate, isobutyl acrylate or 2-ethylhexyl acrylate. Examples of unsaturated epoxides which can be used are in particular:
- aliphatic glycidyl esters and ethers, such as allyl glycidyl ether, vinyl glycidyl ether, glycidyl maleate, glycidyl itaconate, glycidyl acrylate and glycidyl methacrylate, and
- alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

According to another form of the invention, the product (A) is a product having two epoxide functional groups, such as, for example, bisphenol A diglycidyl ether (BADGE).

Product B

Mention may be made, as example of product (B), of those comprising ethylene and an unsaturated carboxylic acid anhydride.

(B) is either a copolymer of ethylene and of an unsaturated carboxylic acid anhydride or a polyolefin grafted by an unsaturated carboxylic acid anhydride.

The polyolefin can be chosen from the abovementioned polyolefins which have to be grafted by an unsaturated epoxide.

Examples of unsaturated dicarboxylic acid anhydrides which can be used as constituents of (B) are in particular maleic anhydride, itaconic anhydride, citraconic anhydride or tetrahydrophthalic anhydride.

Mention may be made, as examples, of the copolymers of ethylene, of an alkyl (meth)acrylate and of an unsaturated carboxylic acid anhydride and the copolymers of ethylene, of a saturated carboxylic acid vinyl ester and of an unsaturated carboxylic acid anhydride.

The amount of unsaturated carboxylic acid anhydride can be up to 15% by weight of the copolymer and the amount of ethylene at least 50% by weight.

Advantageously, (B) is a copolymer of ethylene, of an alkyl (meth)acrylate and of an unsaturated carboxylic acid anhydride. Preferably, the alkyl (meth)acrylate is such that the alkyl has from 2 to 10 carbon atoms.

The alkyl (meth)acrylate can be chosen from those mentioned above.

The MFI of (B) can be, for example, between 0.1 and 50 (g/10 min at 190° C. under 2.16 kg).

According to another form of the invention, (B) can be chosen from aliphatic, alicyclic or aromatic polycarboxylic acids and their partial or complete anhydrides.

Mention may be made, as examples of aliphatic acids, of succinic acid, glutaric acid, pimelic acid, azelaic acid, sebacic acid, adipic acid, dodecanedicarboxylic acid, octadecanedicarboxylic acid, dodecenesuccinic acid and butanetetracarboxylic acid.

Mention may be made, as examples of alicyclic acids, of cyclopentanedicarboxylic acid, cyclopentanetricarboxylic acid, cyclopentanetetracarboxylic acid, cyclohexanedicarboxylic acid, hexanetricarboxylic acid, methylcyclopentanedicarboxylic acid, tetrahydrophthalic acid, endo-methylenetetrahydrophthalic acid and methyl-endo-methylenetetrahydrophthalic acid.

Mention may be made, as examples of aromatic acids, of phthalic acid, isophthalic acid, terephthalic acid, trimellitic acid, trimesic acid or pyromellitic acid.

Mention may be made, as examples of anhydrides, of the partial or complete anhydrides of the above acids.

Use is advantageously made of adipic acid.

It would not be departing from the scope of the invention for a portion of the copolymer (B) to be replaced by an ethylene/acrylic acid copolymer or an ethylene/maleic anhydride copolymer, the maleic anhydride having been completely or partially hydrolyzed. These copolymers can also comprise an alkyl (meth)acrylate. This part can represent up to 30% of (B).

Product C

With regard to the product (C) comprising an unsaturated carboxylic acid, mention may be made, by way of example, of the completely or partially hydrolyzed products (B). (C) is, for example, a copolymer of ethylene and of an unsaturated carboxylic acid and advantageously a copolymer of ethylene and of (meth)acrylic acid.

Mention may also be made of copolymers of ethylene, of an alkyl (meth)acrylate and of acrylic acid.

These copolymers have an MFI between 0.1 and 50 (g/10 min at 190° C. under 2.16 kg).

The amount of acid can be up to 10% by weight and preferably from 0.5 to 5% by weight. The amount of (meth) acrylate is from 5 to 40% by weight.

(C) can also be chosen from $\alpha,\omega$-aminocarboxylic acids, such as, for example, $NH_2$—$(CH_2)_5COOH$, $NH_2$—$(CH_2)_{10}COOH$ and $NH_2(CH_2)_{11}$—$COOH$, and preferably aminoundecanoic acid.

The proportion of (A) and (B) necessary to form the crosslinked phase is determined according to the usual rules of the art by the number of reactive functional groups present in (A) and (B).

For example, in the crosslinked phases comprising (C) chosen from $\alpha,\omega$-aminocarboxylic acids, if (A) is a copolymer of ethylene, of an alkyl (meth)acrylate and of an unsaturated epoxide and (B) is a copolymer of ethylene, of an alkyl (meth)acrylate and of an unsaturated carboxylic acid anhydride, the proportions are such that the ratio of the anhydride functional groups to the epoxy functional groups is in the vicinity of 1.

The amount of $\alpha,\omega$-aminocarboxylic acid is then from 0.1 to 3% and preferably from 0.5 to 1.5% of (A) and (B).

As regards (C) comprising an unsaturated carboxylic acid, that is to say (C) being chosen, for example, from ethylene/alkyl (meth)acrylate/acrylic acid copolymers, the amount of (C) and (B) can be chosen so that the number of acid functional groups and of anhydride functional groups is at least equal to the number of epoxide functional groups and use is advantageously made of the products (B) and (C) such that (C) represents from 20 to 80% by weight of (B) and preferably from 20 to 50%.

It would not be departing from the scope of the invention if a catalyst were added.

These catalysts are generally used for the reactions between the epoxies and the anhydrides.

Mention may in particular be made, among the compounds capable of accelerating the reaction between the epoxy functional group present in (A) and the anhydride or acid functional group present in (B), of:

tertiary amines, such as dimethyllaurylamine, dimethylstearylamine, N-butylmorpholine, N,N-dimethyl-cyclohexylamine, benzyldimethylamine, pyridine, 4-(dimethylamino)pyridine, 1-methylimidazole, tetramethylethylhydrazine, N,N-dimethylpiperazine, N,N,N',N'-tetramethyl-1,6-hexanediamine or a mixture of tertiary amines having from 16 to 18 carbons and known under the name of dimethyltallowamine;

1,4-diazabicyclo[2.2.2]octane (DABCO);

tertiary phosphines, such as triphenylphosphine;

zinc alkyldithiocarbamates.

The amount of these catalysts is advantageously from 0.1 to 3% and preferably 0.5 to 1% of (A)+(B)+(C).

Preferably, the crosslinked polyolefins are present in the composition generally in a content of 5 to 50% by weight, preferably of the order of 30% by weight, with respect to the total weight of the composition.

As regards the noncrosslinked polyolefins, mention may be made of the polyolefins described in the preceding paragraphs which are intended to be grafted by reactive groups. Mention may also be made of the products (A) or (B) or (C) from the preceding paragraphs but used alone in order not to crosslink. Mention may be made, by way of example, of the EPR or EPDM elastomers, it being possible for these elastomers to be grafted in order to facilitate the compatibilizing thereof with the copolyamide. Mention may also be made of acrylic elastomers, for example those of the NBR, HNBR or X-NBR type.

The composition according to the invention can also comprise, in addition, at least one additive as mentioned above in the context of the process for the preparation of the copolyamide.

Of course, a person skilled in the art will choose the chain-terminating agent or agents according to the chemical nature of the additive or additives in order to prevent or control potential reactions between the additive or additives and the chain-terminating agent or agents.

The copolyamide according to the invention or also the composition according to the invention can be used to form a powder or else granules. The copolyamide according to the invention or also the composition according to the invention can also be used to form a structure for subsequent uses or conversions.

This structure can be a monolayer structure when it is formed only of the copolyamide or only of the composition according to the invention.

This structure can also be a multilayer structure when it comprises at least two layers and when at least one of the various layers forming the structure is formed of the copolyamide or of the composition according to the invention.

The powder, the granules or else the structure, whether monolayer or multilayer, can be provided in the form of fibers (for example in order to form a fabric or a nonwoven), of a film, of a pipe, of filaments, of a molded object, of a three-dimensional object obtained by technology involving agglomeration of powder by melting or sintering brought about by radiation, of a hollow body or of an injection-molded part.

For example, the films and sheets can be used in fields as varied as that of electronics or decoration.

The copolyamide according to the invention or the composition according to the invention can advantageously be envisaged for the production of all or part of components of electrical or electronic goods, such as encapsulated solenoids, pumps, telephones, computers or multimedia systems, motor vehicle equipment, such as pipes, pipe connectors, pumps or injection-molded parts under an engine hood, surgical equipment, packaging or sports or leisure equipment, such as in bicycle parts (saddle, pedals).

More particularly, these motor vehicle equipment components, when they exhibit the form of pipes and/or connectors, can in particular be used in devices for admitting air, for cooling (for example by air, cooling liquid, and the like) or for transporting or transferring fuels or fluids (such as oil, water, and the like). Such components can very obviously be rendered antistatic or conductive by preaddition of suitable amounts of conductive fillers (such as carbon black, carbon fibers, carbon nanotubes, and the like) to the copolyamide or the composition according to the invention.

The copolyamide according to the invention or the composition according to the invention can also be envisaged for the production of all or part of components of equipment (in particular pipes, tubes, connectors, pumps, and the like) for the transportation or transfer of gas, oil and its compounds, in particular intended for use in the offshore field.

By way of examples, when the copolyamide according to the invention or the composition according to the invention is in the powder form, the latter can be used in coatings and in particular the coatings having improved thermal resistance intended to cover metal parts used in the transportation of fluids (water, chemicals, oil and gas, and the like), used in the motor vehicle field, for example under an engine hood, or used in the industrial field, in particular engine parts. The powders according to the invention can also be used as additives and/or fillers having an improved thermal resistance in paints requiring a high baking temperature, that is to say of greater than 180° C. These powders can be used in corrosion-resistant compositions, in abrasion-resistant compositions and/or in paints. The powders according to the invention can also be used in technologies involving agglomeration of powder by melting or sintering brought about by radiation, such as, for example, a laser beam (laser sintering) or an infrared beam (IR sintering), in order to manufacture objects. Said powders can in addition be used as additives for paper, or also in electrophoresis gels, or as spacers in multilayer composite materials, in particular between the layers of multilayer materials. Their uses in the packaging, toy, textile, motor vehicle, electronics, cosmetics, pharmaceutical and perfumery industries can be envisaged.

By way of examples, the granules comprising the copolyamide according to the invention or the composition according to the invention are used for the manufacture, in particular by extrusion, of filaments, pipes, films and/or molded objects.

Other aims and advantages of the present invention will become apparent on reading the following examples, given without implied limitation.

EXAMPLES

1) Synthesis Examples

Decanediamine (111.82 g, 0.65 mol), terephthalic acid (104.57 g, 0.63 mol), 11-aminoundecanoic acid (87.00 g, 0.43 mol), stearic acid (6.00 g, 0.021 mol), 60% sodium hypophosphite in water (0.40 g, 0.0022 mol) and water (30 g) are introduced into a 1 liter autoclave reactor. After removing gaseous oxygen by rendering inert with nitrogen, the reactor is brought to a material temperature of 220° C. under a pressure of 20 bar. The temperature is gradually increased over 1 hour up to 260° C. while keeping this pressure constant. The pressure is subsequently gradually brought back over 1 hour by pressure reduction to atmospheric pressure, while the material temperature is increased to 280° C. The polymerization is continued at this temperature for minutes. The polyamide is extracted from the reactor, cooled in water and granulated. Approximately 270 g of polyamide are obtained.

A polyamide with an intrinsic viscosity of 1.14 is obtained.

NMR indicates an aromatic tertiary amide/aromatic secondary amide molar ratio of 0.92% and the polydispersity index obtained by GPC is 2.75.

The contents of COOH chain ends are 7 µeq/g.

The contents of $NH_2$ chain ends are 76 µeq/g.

The contents of $CH_3$ chain ends are 85 µeq/g.

Other examples of polyamides appear in the table below. They are prepared according to the process described above.

The aromatic tertiary amide/aromatic secondary amide molar ratio, denoted NMR T/S Amide in the table, is obtained by NMR.

The polydispersity index is obtained by GPC (Gel Permeation Chromatography) according to the following experimental conditions:

Equipment: Waters Alliance 2695 instrument
Solvent: HexaFluoroIsoPropanol stabilized with 0.05M potassium trifluoroacetate (KTFA)
Flow rate: 1 ml/minute
Temperature of the columns: 40° C.
Set of two columns from PSS: PFG 1000 Å and PFG 100 Å
Concentration of the samples: 1 g/l (dissolution at ambient temperature for 24 h)
Injection volume: 100 µl.

The device is equipped with a Waters 2414 refractometric detector.

Refractometric detection at 40° C.

UV detection at 228 nm

PMMA calibration of 1 900 000 at 402 g·mol$^{-1}$.

The polydispersity index is determined as being equal to the ratio of the weight-average molecular weight to the number-average molecular weight $M_w/M_n$.

The intrinsic viscosity (denoted η) is measured in m-cresol at 20° C. using a micro-Ubbelohde tube, Schott type 538-23 ITC.

The chain end content is measured by NMR (Nuclear Magnetic Resonance). The sample is placed at ambient temperature in $d_2$-dichloromethane with addition of trifluoroacetic anhydride for 16 hours in order to dissolve the polymer. The concentration is of the order of 20 mg/ml.

A proton NMR spectrum is produced at a frequency of 400 MHz on an Avance Bruker 400 (30° pulse, acquisition time+repetition time=10 seconds) at ambient temperature (stabilized at 27° C.). The contents of chain ends are calculated directly from the corresponding lines read on the spectrum.

|   | 10.T in mol | 11 in mol | TA excess (% by weight) | DA 10 excess (% by weight) | Stearic acid (% by weight) | PI | $CH_3$ (µeq/g) | $NH_2$ (µeq/g) | $CO_2H$ (µeq/g) | Intrinsic viscosity |
|---|---|---|---|---|---|---|---|---|---|---|
| A Invention | 1 | 0.7 | — | 1.05 | 2.50 | 2.88 | 105 | 37 | 44 | 1.17 |
| B Comparative | 1 | 0.7 | 0.6 | — | 0.50 | 2.88 | 22 | 11 | 118 | 1.16 |
| C Comparative | 1 | 0.7 | — | 1.2 | — | 2.94 | — | 135 | 26 | 1.23 |
| D Comparative | 1 | 0.7 | — | — | — | 2.76 | — | 49 | 93 | 1.22 |

In particular, test B (comparative) corresponds to example 1 described in the document EP 1 505 099 A1.

Test D had to be halted before having reached atmospheric pressure. The product taken from the reactor is full of bubbles and cannot be correctly granulated. This is due to the excessively high reactivity of the polyamide in the absence of satisfactory chain limitation.

The other tests were correctly polymerized and granules not exhibiting bubbles were obtained. In order to do this, control of the acid, amine and/or unreactive chain ends was imposed. It emerges from the preceding table that the amount of the unreactive chain ends is advantageously greater than the amount of the reactive acid and amine chain ends.

2) Formulation of the Polyamides: Study of the Impact of the Monofunctional Chain Endings 2.1 Study During the Formulation The polyamides defined in the above table were blended in a Buss cokneader with approximately 30% of glass fibers cs ft 692 from Asahi, and 1.4% of an antioxidant additive, Iodine 201, from Ciba. Bars of these formulations were injected according to the standard ISO 179.

On blending in the kneader of Buss type with 30% of glass fibers, the copolyamide C (comparative) is very difficult to formulate (20 bar of head pressure with strand breakages) and then to inject.

The copolyamide A according to the invention is much more fluid (10 bar of head pressure) and is molded perfectly well at 280° C.

| Polyamide | A Invention | B Comparative (high content of acid) | C Comparative (high content of amine) |
|---|---|---|---|
| Intrinsic viscosity after formulation | 1.15 | 1.06 | 1.27 |
| Δ Viscosity | −0.02 | −0.1 | +0.04 |
| PI | 3.13 | 3.2 | 3.43 |

These results make it possible to demonstrate the following points:

a polyamide comprising an excessively high content of amine chain ends, such as the polyamide C, will experience a marked increase in its viscosity during the formulation and will also experience a significant increase in its polydispersity index, a polyamide comprising an excessively high content of acid chain ends, such as the polyamides B, will experience a great reduction in its viscosity during the formulation.

These results show that the characteristics of the polyamide A according to the invention make it possible to result in a material which is stable in viscosity and in molecular weight during its formulation.

2.2 Study on the Materials

A portion of these bars is retained for experiment 1 and the other portion is retained for experiment 2.

Experiment 1

Initial Impact

The bars are conditioned at −40° C. for at least 2 hours. They are subsequently tested by Charpy pendulum impact, ISO 179-1eU, with a 7.5 joule pendulum. The energy absorbed by the bars, expressed in $kJ/m^2$, is measured.

Experiment 2

Impact after Aging

The bars are placed in 1.5 liter autoclaves (at the rate of 16 bars per autoclave) containing 1.4 liters of E85 gasoline (composed of 85% of Rectapur ethanol and 15% of fluid L, a gasoline of 95 lead-free type). These autoclaves are placed in ventilated ovens at 140° C. for 168 hours. After cooling, these bars are immediately conditioned at −40° C. for at least 2 hours.

The unnotched bars are subsequently tested by Charpy pendulum impact, ISO 179-1eU, with a 7.5 joule pendulum, in an identical way to experiment 1. The energy absorbed by the bars, expressed in $kJ/m^2$, is measured.

The results are described in the following table:

| Polyamide | A Invention | B | C |
|---|---|---|---|
| PI | 3.13 | 3.2 | 3.43 |
| Exp 1 | 52.9 | 80.4 | 71.7 |
| Exp 2 | 96.1 | 69.8 | 127.6 |
| PI after 166 h | 3.28 | — | 5.42 |

The above table makes it possible to result in the following conclusions:

Regarding the polyamide B exhibiting an excess of acid chain ends, the impact strength after chemical aging (experiment 2) is poor (decrease in the value).

Regarding the polyamide C exhibiting an excess of amine chain ends, the impact strength after chemical aging (experiment 2) is good but the polydispersity index of the polyamide has increased during the aging. Thus, this product changes substantially over time by branching.

A balance in $NH_2$ and COOH chain ends shows a stability over time of the properties of impact strength and of polydispersity index.

What is claimed is:

1. A copolyamide comprising at least two different units, said copolyamide corresponding to the following formula:

A/X.T

A is a unit obtained from an amino acid, a unit obtained from a lactam or a unit corresponding to the formula ($C_a$ diamine). ($C_b$ diacid), with a representing the number of carbon atoms of the diamine and b representing the number of carbon atoms of the diacid, a and b each being between 4 and 36, the $C_b$ diacid of the unit A being a (cyclo)aliphatic diacid, X.T denotes a unit obtained from the polycondensation of a $C_x$ aliphatic and linear diamine and of terephthalic acid, with x representing the number of carbon atoms of the $C_x$ diamine, x being between 10 and 36, said copolyamide exhibiting:
a content of amine chain ends of 25 to 58 μeq/g,
a content of acid chain ends of less than or equal to 100 μeq/g, and
a content of unreactive chain ends of greater than or equal to 20 μeq/g.

2. The copolyamide as claimed in claim 1, characterized in that X.T denotes a unit obtained from the polycondensation of a $C_x$ aliphatic and linear diamine chosen from decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22) and diamines obtained from fatty acids and of terephthalic acid.

3. The copolyamide as claimed in claim 1, characterized in that the content of acid chain ends is between 2 and 80 μeq/g.

4. The copolyamide as claimed in claim 1, characterized in that the content of unreactive chain ends is greater than or equal to 30 μeq/g.

5. The copolyamide as claimed in claim 1, comprising at least a third unit, said copolyamide corresponding to the following formula:

A/X.T/Z in which:
the units A and X.T are as defined in claim 1,
Z being chosen from a unit obtained from an amino acid, a unit obtained from a lactam and a unit corresponding to the formula ($C_d$ diamine).($C_e$ diacid), with d representing the number of carbon atoms of the diamine and e representing the number of carbon atoms of the diacid, d and e each being between 4 and 36.

6. A process for the preparation of the copolyamide as defined in claim 5, comprising polycondensing of the comonomers: monomers resulting in the units A and X; terephthalic acid; an additional monomer resulting in the unit Z, being obtained from an amino acid, a unit obtained from a lactam or a unit corresponding to the formula ($C_d$ diamine).($C_e$ diacid), with d representing the number of carbon atoms of the diamine and e representing the number of carbon atoms of the diacid, d and e each being between 4 and 36; and of at least one chain-terminating agent.

7. The process according to claim 6, wherein d and e are between 9 and 18.

8. The copolyamide of claim 5, wherein d is between 9 and 18.

9. The copolyamide as claimed in claim 5, of formula 11/10.T/2, 11/10.T/6, 12/10.T/6, 11/10.T/10.I, 11/10.T/10.6, 12/10.T/10.1 or 12/10.T/10.6.

10. The copolyamide as claimed in claim 5, wherein d and e are between 9 and 18.

11. The copolyamide as claimed in claim 1, characterized in that the unit X denotes a unit obtained from 1,10-decanediamine.

12. The copolyamide as claimed in claim 1, characterized in that the unit A denotes a unit obtained from a monomer chosen from 10-aminodecanoic acid (denoted 10), 11-aminoundecanoic acid (denoted 11), 12-aminododecanoic acid (denoted 12) and lauryllactam (denoted L12).

13. The copolyamide as claimed in claim 1, characterized in that it is of formula 11/10.T, or 12/10.T.

14. A composition comprising at least one copolyamide as defined in claim 1.

15. The composition as claimed in claim 14, comprising a crosslinked polyolefin obtained by reaction of
(A) a polyolefin or an ethylene copolymer comprising an unsaturated epoxide, and
(B) an ethylene copolymer or a polyolefin comprising an unsaturated carboxylic acid anhydride, and
optionally (C) an ethylene copolymer comprising an unsaturated carboxylic acid or an α,ω-aminocarboxylic acid.

16. The composition as claimed in claim 14, comprising at least one additive that is fillers, glass fibers, dyes, stabilizers, plasticizers, impact modifiers, surface-active agents, pigments, optical brighteners, antioxidants, natural waxes or polyolefins.

17. The composition of claim 16, wherein the stabilizer is a UV stabilizer.

18. A copolyamide as defined in claim 1 in the form of a powder, granules, a monolayer structure or at least one layer of a multilayer structure.

19. The copolyamide as claimed in claim 18, wherein the monolayer structure or the multilayer structure are in the form of fibers, of a film, of a pipe, of filaments, of a molded object, of a three-dimensional object obtained by a technology involving agglomeration of powder by melting or sintering brought about by radiation, of a hollow body or of an injection-molded part.

20. In paints, coatings, corrosion-resistant compositions, abrasion-resistant compositions, technologies involving agglomeration of powder by melting or sintering brought about by radiation in order to manufacture objects, paper, electrophoresis gels, multilayer composite materials, each comprising an additive or filler which is a copolyamide, the improvement wherein the copolyamide is one as claimed in claim 18.

21. In coatings having improved thermal resistance for metal parts used in the transportation of fluids, in the motor vehicle field, under an engine hood, in the industrial field and/or in engine parts, the improvement comprising using in said coatings a copolyamide of claim 1.

22. The copolyamide of claim 1, wherein a is between 9 and 18.

23. The copolyamide of claim 1, wherein a is between 10 and 18.

24. The copolyamide as claimed in claim 1, characterized in that the content of amine chain ends is between 30 and 58 µeq/g.

25. The copolyamide as claimed in claim 1, characterized in that the content of acid chain ends is between 15 and 50 µeq/g.

26. The copolyamide as claimed in claim 1, characterized in that the content of unreactive chain ends is between 35 and 200 µeq/g.

* * * * *

UNITED STATES PATENT AND TRADEMARK OFFICE
CERTIFICATE OF CORRECTION

PATENT NO.         : 9,012,026 B2
APPLICATION NO.    : 14/242185
DATED              : April 21, 2015
INVENTOR(S)        : Briffaud et al.

Page 1 of 1

It is certified that error appears in the above-identified patent and that said Letters Patent is hereby corrected as shown below:

In the claims,

Column 19, line 20, reads "11/10.T/2, 11/10.T/6, 12/10.T/6, 11/10.T/10.1, 11/10.T/10.6," should read -- 11/10.T/12, 11/10.T/6, 12/10.T/6, 11/10.T/10.1, 11/10.T/10.6, --

Signed and Sealed this
Twenty-ninth Day of December, 2015

Michelle K. Lee
*Director of the United States Patent and Trademark Office*